United States Patent
Aoki et al.

(10) Patent No.: US 6,630,758 B2
(45) Date of Patent: Oct. 7, 2003

(54) MOTOR WITH A STATIONARY SHAFT WITH FORMED KNURLED GROOVES ON SHAFT AND/OR HOUSING

(75) Inventors: Mamoru Aoki, Fujisawa (JP); Takayuki Miyagawa, Fujisawa (JP); Hiroshi Ishiwada, Fujisawa (JP)

(73) Assignee: NSK Ltd., Tokyo (JP)

( * ) Notice: Subject to any disclaimer, the term of this patent is extended or adjusted under 35 U.S.C. 154(b) by 8 days.

(21) Appl. No.: 09/851,347

(22) Filed: May 9, 2001

(65) Prior Publication Data

US 2002/0047390 A1 Apr. 25, 2002

(30) Foreign Application Priority Data

May 11, 2000 (JP) .................................. 2000-137912

(51) Int. Cl.$^7$ .......................... H02K 11/00; H02K 7/00; H02K 5/16; H02K 7/08
(52) U.S. Cl. .................... 310/67 R; 310/90; 384/450; 384/513
(58) Field of Search .................... 310/67 R, 90; 384/450, 513

(56) References Cited

U.S. PATENT DOCUMENTS

| | | | | |
|---|---|---|---|---|
| 3,459,978 A | * | 8/1969 | Trucks et al. | 310/51 |
| 3,614,484 A | * | 10/1971 | Shoh | 310/325 |
| 3,955,861 A | * | 5/1976 | Orain | 384/495 |
| 4,215,287 A | * | 7/1980 | Otto | 310/217 |
| 4,377,762 A | * | 3/1983 | Tatsumi et al. | 310/42 |
| 4,622,860 A | * | 11/1986 | Cametti et al. | 74/448 |
| 4,792,244 A | * | 12/1988 | Yamashita et al. | 384/492 |
| 4,862,581 A | * | 9/1989 | Royer | 29/596 |
| 5,246,296 A | * | 9/1993 | Chi | 384/540 |
| 5,302,030 A | * | 4/1994 | Buie et al. | 384/18 |
| 5,363,003 A | * | 11/1994 | Harada et al. | 310/67 R |
| 5,382,862 A | * | 1/1995 | Ward et al. | 310/263 |
| 5,406,154 A | * | 4/1995 | Kawaguchi et al. | 310/67 R |
| 5,448,119 A | * | 9/1995 | Kono et al. | 310/67 R |
| 5,460,455 A | * | 10/1995 | Chen | 384/458 |
| 5,496,114 A | * | 3/1996 | Lin | 384/458 |
| 5,497,040 A | * | 3/1996 | Sato | 310/67 R |
| 5,510,661 A | * | 4/1996 | Yoshimura et al. | 310/90 |
| 5,528,092 A | * | 6/1996 | Ohta | 310/67 R |
| 5,564,995 A | * | 10/1996 | Roder et al. | 475/331 |
| 5,596,235 A | * | 1/1997 | Yazaki et al. | 310/67 R |
| 5,654,598 A | * | 8/1997 | Horski | 310/67 R |
| 5,705,866 A | * | 1/1998 | Oguchi | 310/67 R |
| 5,796,192 A | * | 8/1998 | Riepl | 310/67 R |
| 5,841,210 A | * | 11/1998 | Obara | 310/90 |
| 5,880,545 A | * | 3/1999 | Takemura et al. | 310/90 |
| 5,996,209 A | * | 12/1999 | Molnar et al. | 29/596 |
| 6,084,323 A | * | 7/2000 | Pelstring et al. | 310/67 R |
| 6,316,855 B1 | * | 11/2001 | Moosmann et al. | 310/71 |
| 6,462,441 B1 | * | 10/2002 | Horng et al. | 310/67 R |
| 2002/0008432 A1 | * | 1/2002 | Akahori | 310/90 |
| 2002/0047387 A1 | * | 4/2002 | Obara | 310/90 |
| 2002/0109421 A1 | * | 8/2002 | Horng et al. | 310/67 R |
| 2002/0171302 A1 | * | 11/2002 | Takayanagi | 310/90 |
| 2003/0059144 A1 | * | 3/2003 | Umekida et al. | |

FOREIGN PATENT DOCUMENTS

| | | | | |
|---|---|---|---|---|
| JP | 062120201 | * | 6/1987 | B60B/35/18 |
| JP | 0620633 A1 | * | 4/1994 | H02K/5/173 |
| JP | 2890159 | | 2/1999 | |

* cited by examiner

Primary Examiner—Dang Le
Assistant Examiner—Heba Y. Elkassabgi
(74) Attorney, Agent, or Firm—Crowell & Moring LLP

(57) ABSTRACT

A motor comprises a rotor, a stator, and a shaft wherein one of the stator and the rotor is provided with a housing, a rolling bearing is provided between the housing and the shaft and having an inner race and outer race, the inner race is fixed to the shaft through adhesion between the outer peripheral surface of the shaft and the inner peripheral surface of the inner race, the outer race is fixed to the housing through press-fitting, and the outer peripheral surface of the shaft is formed with knurled grooves, where the number (P) of the knurled grooves in the circumferential direction and the number (Z) of the rolling members in the rolling bearing are in the relations of $P \neq n Z$ and $P \neq nZ \pm 1$ where n is a positive integer.

2 Claims, 2 Drawing Sheets

MOTOR WITH A STATIONARY SHAFT WITH FORMED KNURLED GROOVES ON SHAFT AND/OR HOUSING

BACKGROUND OF THE INVENTION

1. Field of the Invention

The present invention is related to a motor for use in office automation devices such as the magnetic hard disc drive device (HDD), video tape recorder (VTR) and laser beam printer (LBP).

2. Related Art of the Invention

The motor for the office automation devices generally comprises a rotor with a magnet fixed to it and a stator with a coil fixed to it. The rotor or stator is provided with a housing, and a rolling bearing is provided between the housing and a shaft.

Conventionally, an adhesive is used to fix the rolling bearing between the shaft and the housing in the office automation devices. For example, in order that the inner race is fixed to the shaft, a groove is formed around the shaft, and the adhesive is provided between the groove and the inner peripheral surface of the inner race, so that the uniform bonding is made in the circumferential direction.

According to the publication of JP Patent No. 2890159, the outer peripheral surface of the shaft is formed with a knurled portion and a circumferential groove, and an adhesive is put in between the grooves of the knurled portion and the inner peripheral surface of the inner race and into the circumferential groove to fix the inner race to the shaft. In addition, there is a case that the rolling bearing is fixed to the inner race through press-fitting with no adhesive used.

The inner peripheral circle of the inner race and the outer peripheral circle of the shaft in cross section could not be complete in roundness, and therefore the thickness of the adhesive is inclined to be uneven in the circumferential direction even if the knurled portion and the circumferential groove are formed. As a result, the expansion and shrinkage forces of the adhesive may be so uneven in the circumferential direction that the races are deformed and that the rotation precision of the motor is worsened. For example, the non-repetitive runout (NRRO), that does not synchronize with the rotation, may be caused in the motor.

On the other hand, upon press-fitting, the precision (roughness) of the surfaces press-fitted is transferred to the raceway to deform the race.

SUMMARY OF THE INVENTION

Taking such problems into consideration, an objective of the present invention is to provide a motor comprising a rotor and stator where a rolling bearing is provided between a housing provided in a rotor or stator and a shaft, such that the races of the rolling bearing is prevented from being deformed and that the rotation precision of the motor is improved.

BRIEF DESCRIPTION OF THE INVENTION

PREFERRED EMBODIMENT OF THE INVENTION

Figure 1:
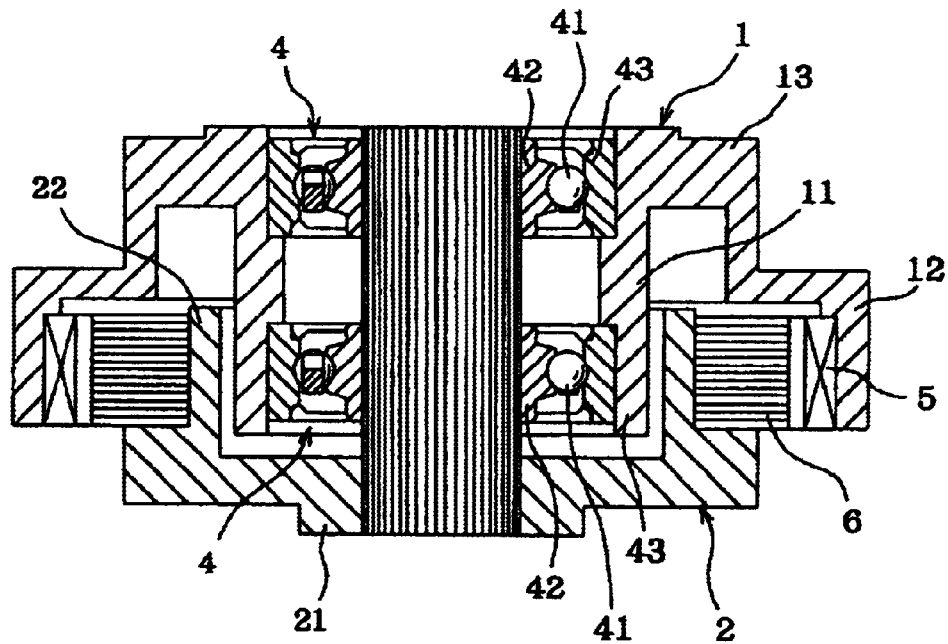
FIG. 1 is a cross sectional view of an embodiment of the motor according to the present invention.

The present invention provides a motor comprising a rotor, a Stator and a shaft, wherein the stator or rotor is provided with a housing, and a rolling bearing is provided between the housing and the shaft, and wherein the inner race and the outer race of the rolling bearing are fixed to the shaft and the housing, respectively, through press-fitting or through adhesion with the grooves formed in the outer peripheral surface of the shaft and in the inner peripheral surface of the housing.

Specifically, in one feature of the motor of the present invention, the outer peripheral surface of the shaft and/or the inner peripheral surface of the housing are formed with knurled grooves, and wherein the number (P) of the grooves in the circumferential direction and the number (Z) of the rolling members in the rolling bearing are in the relations of $P \neq n Z$ and $P \neq nZ \pm 1$ where n is a positive integer.

In another feature of the motor, specifically the outer peripheral surface of the shaft and/or the inner peripheral surface of the housing are formed with knurled grooves, and the number (P) of the knurled grooves in the circumferential direction and the number (Z,) of the rolling members in the rolling bearing are in the relation of $P = nZ \pm X$, where n is a positive integer, and X is 2 or an integer larger than 2.

If $P = nZ$, the expansion and shrinkage forces of the adhesive are uneven in the circumferential direction, so that deformation (undulation) having nZ waves is inclined to occur on the races. With the undulation on the races, abnormal runout occurs in the axial direction during rotation of the rolling bearing every time when the rolling members roll over the waves.

If $P = nZ \pm 1$, the expansion and shrinkage forces of the adhesive are uneven in the circumferential direction, so that deformation (undulation) having $(nZ \pm 1)$ waves is inclined to occur on the races. With the undulation on the races, abnormal runout occurs in the radial direction during rotation of the rolling bearing every time when the rolling members roll over the waves.

In the present invention, with the relations of $P \neq n Z$ and $P \neq nZ \pm 1$ where n is a positive integer, the occurrence of such abnormal runout is prevented. And, with the relation of $P = nZ \pm X$, where n is a positive integer, and X is 2 or an integer larger than 2, which satisfies the relation of $P \neq n Z$ and of $P \neq nZ \pm 1$ where n is a positive integer, the occurrence of such abnormal runout is prevented.

Even if the relations of $P \neq n Z$ and $P \neq nZ \pm 1$ where n is a positive integer are satisfied, when the number of waves in the undulation existing originally in the races per se is equal to a measure (except for 1 and P) of the number (P) of knurls, the undulation originally existing on the races may be compounded to the undulation transferred from the knurls by adhesion, depending on the phase upon fixing with adhesion, to produce on the races the undulation in the relation of $P = n Z$ or of $P = nZ \pm 1$ where n is a positive integer. Accordingly, it is desired that the numeral of P satisfies the above relations and a prime number.

In the present invention, the term "knurled groove" means a groove formed on the outer peripheral surface of the shaft to extend in parallel or on the slant with respect to the axial direction.

The present invention is further explained with reference to the drawings.

FIG. 1 is a cross sectional view of a motor corresponding to an embodiment of the present invention. This motor is a spindle motor for the HDD and comprises a rotor 1, a stator 2, a shaft 3 and a rolling bearing, specifically ball bearing 4. The rotor 1 has a magnet 5 fixed to it, and the stator 2 has a coil 6 fixed to it.

The rotor 1 comprises a sleeve (housing) 11 in a cylindrical shape with a small diameter, an outer cylindrical portion 12 having a diameter larger than the diameter of the sleeve 11, and a hub 13 provided between the sleeve 11 and the outer cylindrical portion 12. The ball bearing 4 and shaft 3 are inserted into the sleeve 11, and the magnet 5 is inserted into the inner peripheral surface of the outer cylindrical portion 12. The hub 13 receives a magnetic disc when the motor is used.

The stator 2 comprises a base 21 to which one end of the shaft 3 is fixed, and a cylindrical portion 22 formed on the outer peripheral portion of the base 21. The cylindrical portion 22 is located between the sleeve 11 and the outer cylindrical portion 12 in the radial direction of the shaft 3, and the coil 6 is located on the outer periphery of the cylindrical portion 22. Accordingly, the magnet 5 faces the coil 6 with a predetermined gap between them.

Figure 2:
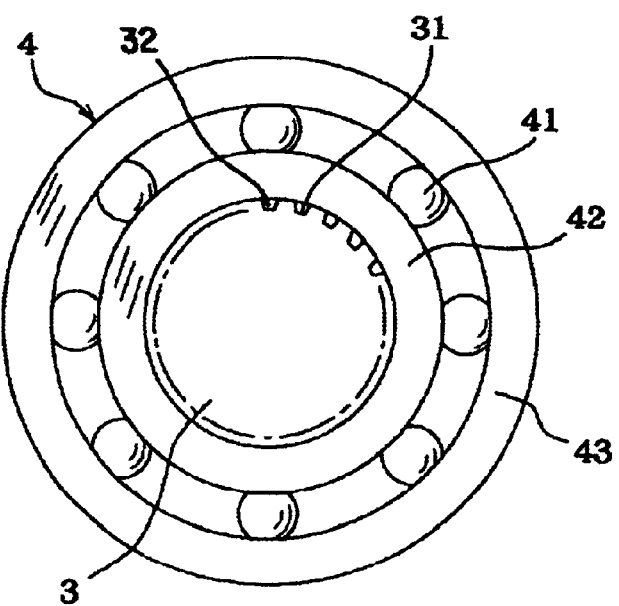
FIG. 2 is a plan view to show a relation between the shaft and the bearing in the motor of FIG. 1.

FIG. 2 is a plan view to show the relation between the shaft 3 and the ball bearing 4 in the motor mentioned above. As illustrated, the ball bearing 4 has eight balls (rolling members) 41. Eighteen knurled grooves 31 are formed on the outer peripheral surface of the shaft 3. The knurled grooves 31 extend in parallel to the axial direction generally along the whole length of the shaft 3, and arranged in the whole circumference with a uniform circumferential space between them and with a uniform width.

The number (P) of the knurled grooves 31 is related with the number (Z=8) of the balls (rolling members) 41 of the ball bearing 4 and the relation is given in the equation of P=2Z+2. Filled in between the knurled grooves 31 and the inner peripheral surface of the inner race 42 is an adhesive 32, for example, an anaerobic adhesive which is hardened to fix the inner race 42 to the shaft 3. The outer race 43 is inserted into and fixed to the sleeve 11 by press-fitting.

Accordingly, with this motor, because of the relation of P≠n Z and of P≠nZ±1 where n is a positive integer, between the number (P) of the knurled grooves 31 and the number (Z) of the balls (rolling members) 41 of the ball bearing 4, the inner race 42 does not suffer from the harmful deformation which would be caused in the case of P=nZ or P=nZ±1. Accordingly, the NRRO is prevented from being produced in the motor, and the rotation precision of the motor is high.

Figure 3:
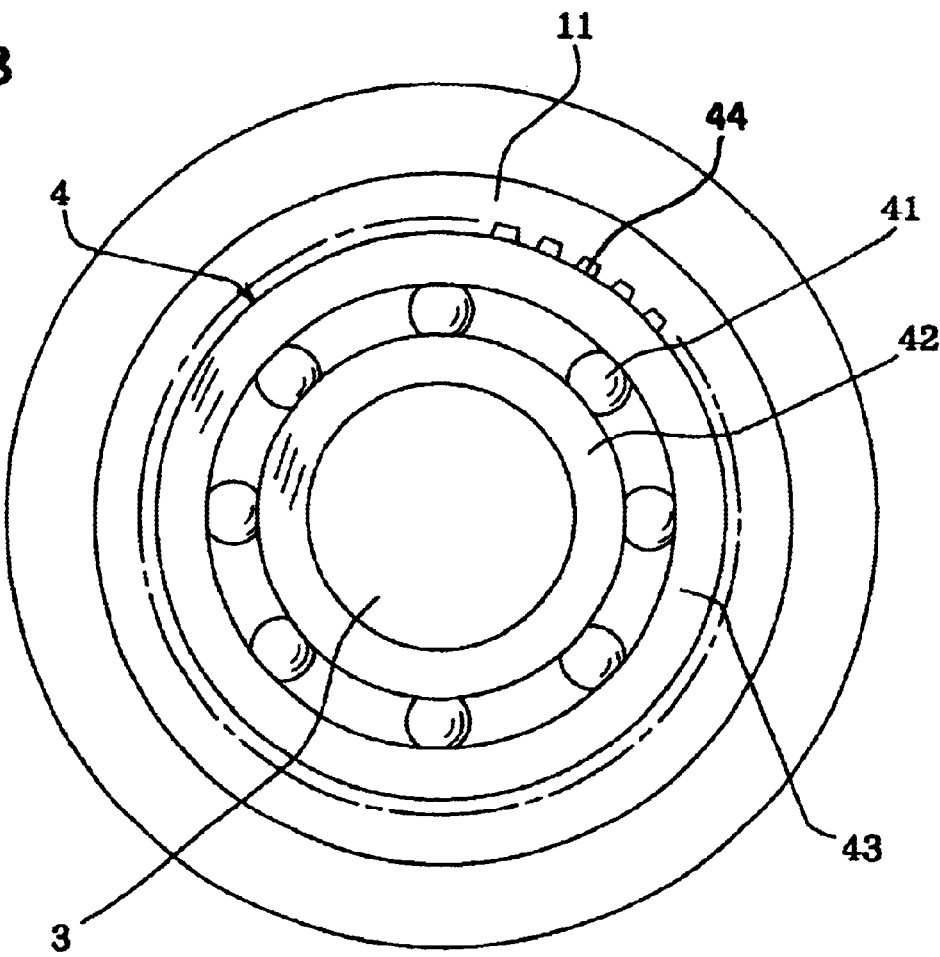
FIG. 3 is a plan view to show another relation between the shaft and the bearing.

Incidentally, in this embodiment, only the outer peripheral surface of the shaft 3 is formed with the knurled grooves 31 satisfying the present invention in number so as to bond the shaft 3 to the inner race 42. In addition to this, the inner peripheral surface of the sleeve 11 may be formed with the knurled grooves 31 satisfying the present invention in number so as to bond the sleeve (housing) 11 to the outer race 43. Or, only the inner peripheral surface of the sleeve 11 may be formed with the knurled grooves 31 satisfying the present invention in number so as to bond the sleeve (housing) 11 to the outer race 43 using an adhesive 44 as shown in FIG. 3. In this case, the shaft 3 is fitted into or bonded to the inner race 42.

In addition, in the case where with the knurled grooves satisfying the present invention in number formed on the outer peripheral surface of the shaft and/or on the inner peripheral surface of the housing, the inner race is fixed to the shaft through press-fitting and/or the outer race is fixed to the housing through press-fitting, the inner race and/or outer race do not suffer from the harmful deformation which would be caused in the case of P=nZ or P=nZ±1. Accordingly, the NRRO is prevented from being produced in the motor, and the rotation precision of the motor is high.

With the present invention, in the motor comprising a rotor, a stator, and a shaft such that the rotor or stator is provided with a housing and that a rolling bearing is provided between the housing and the shaft, it is possible to prevent the races of the rolling bearing from being deformed, so the rotation precision of the motor is high.

What is claimed is:

1. A motor comprising a rotor, a stator, a shaft, and a rolling bearing, one of the stator and the rotor being provided with a housing, the rolling bearing being provided between the housing and the shaft and having an inner race and outer race, the shaft having an outer peripheral surface, the housing having an inner peripheral surface, the inner race having an inner peripheral surface and the outer race having an outer peripheral surface, the inner race being fixed to the shaft through one of press-fitting and use of an adhesive between the outer peripheral surface of the shaft and the inner peripheral surface of the inner race, the outer race being fixed to the housing through one of press-fitting and use of an adhesive between the outer peripheral surface of the outer race and the inner peripheral surface of the housing, and at least one of the outer peripheral surface of the shaft and the inner peripheral surface of the housing being formed with knurled grooves, wherein the number (P) of the knurled grooves in the circumferential direction and the number (Z) of the rolling members in the rolling bearing are in the relations of P≠nZ and P≠nZ±1 where n is a positive integer.

2. A motor comprising a rotor, a stator, a shaft, and a rolling bearing, one of the stator and the rotor being provided with a housing, the rolling bearing being provided between the housing and the shaft and having an inner race and outer race, the shaft having an outer peripheral surface, the housing having an inner peripheral surface, the inner race having an inner peripheral surface and the outer race having an outer peripheral surface, the inner race being fixed to the shaft through one of press-fitting and use of an adhesive between the outer peripheral surface of the shaft and the inner peripheral surface of the inner race, the outer race being fixed to the housing through one of press-fitting and use of an adhesive between the outer peripheral surface of the outer race and the inner peripheral surface of the housing, and at least one of the outer peripheral surface of the shaft and the inner peripheral surface of the housing being formed with knurled grooves, wherein the number (P) of the knurled grooves in the circumferential direction and the number (Z) of the rolling members in the rolling bearing are in the relation of P=nZ±X where n is a positive integer, and X is 2 or an integer larger than 2.

* * * * *